United States Patent [19]
Hopwood

[11] 3,846,748
[45] Nov. 5, 1974

[54] SIGNALING SYSTEM AND SENSOR

[76] Inventor: Charles E. Hopwood, 1319 S. Michigan Ave., Clearwater, Fla. 33516

[22] Filed: Mar. 23, 1973

[21] Appl. No.: 344,196

[52] U.S. Cl. ............................ 340/71, 200/61.47
[51] Int. Cl. ..................... B60q 1/26, H01h 35/02
[58] Field of Search .......... 340/66, 67, 71, 72, 262; 200/61.45, 61.47, 61.52

[56] References Cited
UNITED STATES PATENTS

| | | | |
|---|---|---|---|
| 1,951,699 | 3/1934 | Lewis | 200/61.47 X |
| 2,068,315 | 1/1937 | Erich | 200/61.47 X |
| 2,161,411 | 6/1939 | Erich | 200/61.47 |
| 2,432,388 | 12/1947 | Curtiss | 340/54 |
| 2,542,211 | 2/1951 | Sauri | 200/61.47 X |
| 2,831,183 | 4/1958 | Womack | 340/262 |
| 3,073,922 | 1/1963 | Miller | 340/66 X |
| 3,215,979 | 11/1965 | Ryan | 340/66 |
| 3,564,531 | 2/1971 | Burgin | 200/61.47 X |
| 3,657,695 | 4/1972 | Birmingham | 340/52 H |

FOREIGN PATENTS OR APPLICATIONS 967,335   3/1960   France .............................. 340/262

Primary Examiner—Donald J. Yusko
Attorney, Agent, or Firm—Robert F. Ruemeli

[57] ABSTRACT

A signal system indicates when a vehicle is decelerating, moving at substantially constant velocity, and/or accelerating. Mercury switches close circuits to amber signal lights when the vehicle is decelerating, and to green signal lights when the vehicle is accelerating and/or traveling at constant velocity. The mercury switches are preferably adjustably mounted and are fixedly retained in adjusted position on the vehicle.

4 Claims, 8 Drawing Figures

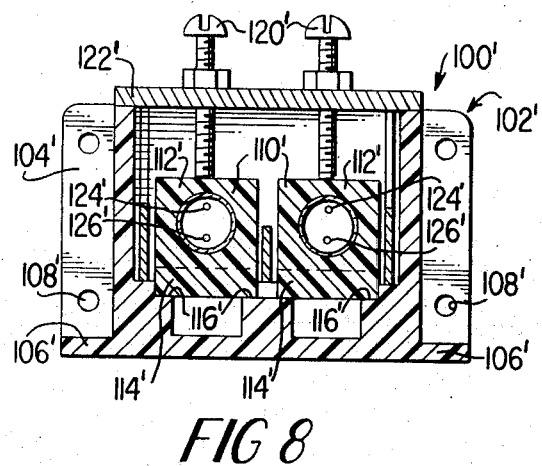
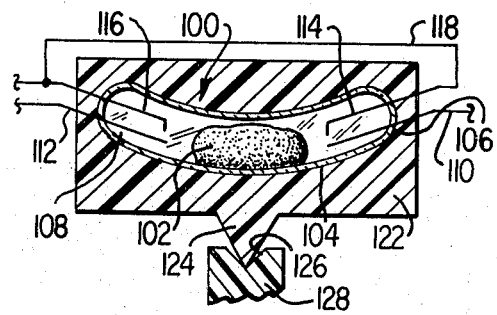
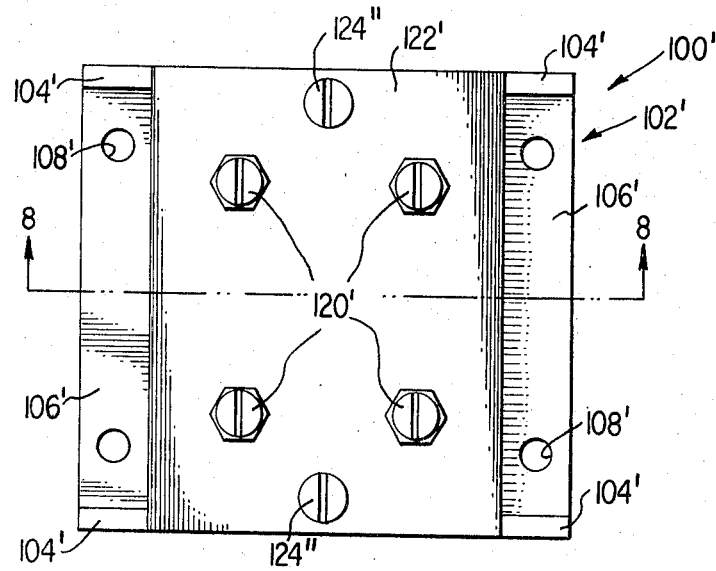

SIGNALING SYSTEM AND SENSOR

This invention relates to signaling and, more particularly, to a signal system and sensor unit for the system, and is particularly suited for use on motor vehicles, or the like.

BACKGROUND OF THE INVENTION

Conventional signaling lights on motor vehicles generally include the typical red tail lights which are illuminated whenever the vehicle brakes are applied and a companion light which is illuminated whenever the parking lights or headlights are illuminated. Directional signals, which are operated by the driver for indicated intended turns, are normally an amber color and may be operated in unison for indicating when the vehicle is stopped or traveling very slowly. Optional signals may include side lights which are generally amber so that the vehicle is more visible from the side.

While not in common use at the present time, various signal systems have been proposed for use on motor vehicles. These systems are generally directed to indicating when the vehicle is decelerating and sometimes for indicating the rate of deceleration. Various patents show systems of this type.

For example, a "Vehicle Deceleration Indicator" is shown in U.S. Pat. No. 3,157,854, the length of a band of light increases as deceleration increases. A horizontal series of individual signal lights are progressively illuminated by an inertia responsive sensor as the rate of deceleration increases. The sensor includes an inertia responsive weight on a sliding rod, the weight and rod acting against a compression spring for progressively placing additional ones of the signal lights in a circuit as deceleration increases. The system is relatively complicated and expensive in construction, and would be subject to the usual electrical contact deterioration.

A "Deceleration Warning Signal System" is shown in U.S. Pat. No. 3,431,556. An inertia responsive variable resistance increases the flashing rate of signal lights responsive to the rate of deceleration of the vehicle. Again, the system is rather complicated mechanically and is subject to the usual electrical failures and deterioration of components.

In U.S. Pat. No. 3,659,268, a "Vehicle Deceleration Warning Apparatus" includes a switch mechanism connected to the acceleration linkage of the vehicle as well as an inertia mechanism responsive to deceleration forces of the vehicle so that the signal light is illuminated responsive to actual or intended deceleration in excess or a preset speed range. Again, the inertia responsive mechanism is of a mechanical nature and subject to the usual mechanical wear and maintenance, and deterioration of the electrical components.

In U.S. Pat. No. 3,501,742, a "Deceleration Signaling System for Motor Vehicles" provides a dual signal in the form of a relatively weak signal light upon deceleration of the vehicle below a predetermined rate and a bright flashing light upon deceleration above the predetermined rate. The sensing mechanism is of a relatively involved mechanical nature requiring maintenance.

In U.S. Pat. No. 3,332,060, a "Vehicle Deceleration Signaling Apparatus" provides increased intensity of the stop lights as the rate of deceleration increases. In one version of the apparatus a ball rolls upwardly along a pair of spaced apart tracks responsive to an increase in deceleration of the vehicle, one of the tracks serving the function of variable resistance to increase the brightness of the stop lights as the rate of deceleration increases. In another version, a roller moves along tracks to provide the same function. However, electrical contact in these devices is subject to deterioration and the devices having moving parts which are inherently subject to wear.

A sensor including a mercury switch is shown in U.S. Pat. No. 2,971,067, as part of an "Automatic Emergency Signaling Device for Automotive Vehicles." The mercury switch is mounted on a pivoted sector which carries a pendulum for swinging the sector and thereby changing the inclination of the mercury switch to open an electrical circuit responsive to deceleration of the vehicle. Upon opening of the mercury switch a flasher is placed in circuit so that the stop lights commence flashing upon rapid deceleration. However, this mercury switch is not itself inertia responsive but rather is responsive to a change of its inclination responsive to movement of the sector by the pendulum.

In general the devices disclosed in the previously discussed patents rely on mechanical devices with numerous moving parts and with the exception of the last noted patent, require typical mechanical contacts for making and breaking circuits. Such contact inheritantly requires cleaning or replacement.

Furthermore, the prior patents appear to be devoid of any signaling system for indicating acceleration of a vehicle. Such an acceleration signal would be helpful to a following driver in regulating the operation of his vehicle in keeping with that of the preceeding vehicle in order to provide a smoother flow of traffic.

THE INVENTION, IN BRIEF

The invention, in brief, is directed to a signaling system and sensor unit for indicating deceleration, substantially constant velocity travel, and/or acceleration of a vehicle, or any combination thereof. A fluid sensor unit, and preferably a mercury switch, is mounted in fixed position on the vehicle for operating the system. Aside from movement of the mercury, the system has no moving parts and has no electric contacts which require regular attention. The sensor unit and the system as a whole are relatively inexpensive and trouble free.

It is a primary object of this invention to provide a new and useful signaling system.

Another object is provision of a new and useful sensor unit responsive to acceleration or deceleration, or both, of a vehicle and, if desired, responsive to generally constant velocity operation of the vehicle.

Still another object is provision of a new and useful sensor unit including a first conductor including a fluid for engagement with contact means, the fluid being positioned for movement between a normal position and a position in circuit with the contact means responsive to a change in inertia. A related object is provision for retaining the fluid in a container operatively mounted in substantially fixed position. Another related object is provision for movement of the mass between the foresaid positions irrespective of any normal movement of the container. A further related object is provision of a path for movement for the fluid between the aforesaid positions with the container mounted for adjusting the inclination of the path. A more specific related object provides for the container being sealed, the fluid being mercury, and the contact means in the form of an electrode and the container, mercury and electrode collectively comprising a fixedly mounted mercury switch.

Still another object is provision of a new and useful vehicle signaling system having a first signal operable responsive to the vehicle decelerating, a second signal operable responsive to the vehicle accelerating, a sensor operable between first and second phases responsive to the vehicle decelerating and accelerating, respectively, and the sensor being connected in circuit with the signals for operating the signals responsive to operation of the sensor to its first and second phases, respectively. A related object is provision of the sensor in the form of a container and a fluid therein for movement of the fluid between first and second phases, respectively. Another related object is provision in the sensor of generally horizontally spaced apart first and second members and the fluid engaging the first member in the first position and the second member in the second position. A further related object includes provision for mounting a container on the vehicle with the members spaced apart in the normal direction of the movement of the vehicle. A still further related object is provision of the container being substantially fixed relative to the vehicle. A more specific related object is provision of the container in the form of a sealed mercury tube, the members in the form of electrodes, one at each opposite end of the tube and the fluid in the form of mercury, the first electrode being in circuit with the first signal, the second electrode being in circuit with the second signal, so that a circuit is closed between the appropriate one of the signals responsive to acceleration on deceleration of the vehicle respectively. Still another related object is provision of a pair of mercury switches, one of the switches actuating the first signal and the other of the switches actuating the second signal, and the switches being independently adjustable to operatively fixed positions relative to the vehicle.

These and other objects and advantages of the invention will be apparent from the following description and the accompanying drawing.

BRIEF DESCRIPTION OF DRAWING

FIG. 6 is a fragmentary, schematic elevational view similar to FIG. 4, of another embodiment of a portion of the sensor unit shown in FIGS. 3–5;

FIG. 7 is a schematic top view of another embodiment of a sensor unit; and

FIG. 8 is a schematic, vertical sectional view taken generally along the line of 8—8 in FIG. 7.

DESCRIPTION OF THE ILLUSTRATED EMBODIMENTS

Figure 1:
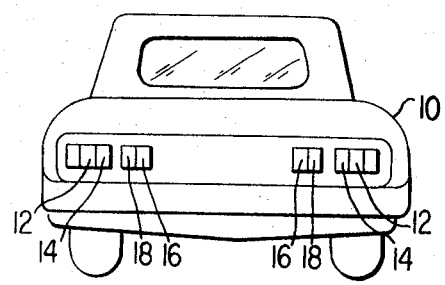
FIG. 1 is a schematic rear view of an automobile having various signal lights thereon.

Referring to the drawing, FIG. 1 shows the rear end of a typical motor vehicle 10 in the form of an automobile having the usual red tail and braking light signals 12 and flashing amber light directional signals 14, and additionally having amber light signals 16 for indication of deceleration and, if desired, normal constant velocity operation of the vehicle 10, and green light acceleration signals 18.

The amber light signal 16 and the green light signal 18 may be connected in circuit for operation in various desired modes. As shown in the embodiment of FIGS. 2–5, the amber signals 16 are illuminated whenever the vehicle is decelerating. The green signals 18 are connected to be illuminated only when the vehicle is accelerating or is traveling at substantially constant velocity.

Figure 2:
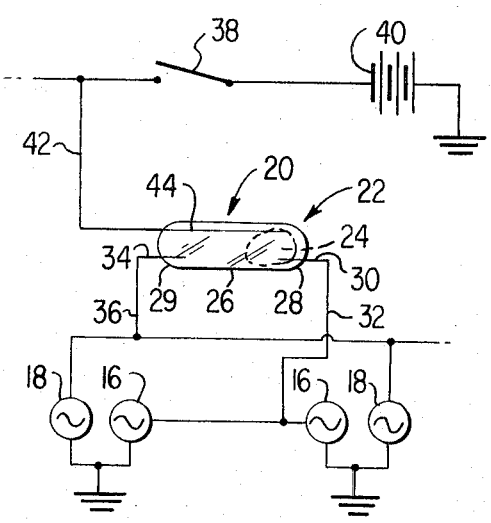
FIG. 2 is a wiring diagram of a portion of the electrical signal of the automobile shown in FIG. 1, for operating acceleration and deceleration signal lights shown in FIG. 1.

With particular reference to FIG. 2, the signals 16 and 18 are connected in circuit with a sensor unit 20 (FIGS. 3–5) including a sensor switch 22. More particularly, the sensor switch 22 includes an electrically conductive fluid, preferably in the form of a body of mercury 24, in a container generally in the form of a sealed tube 26 having opposite ends 28 and 29.

The tube 26 is preferably operatively fixed to a portion of the vehicle with its end 28 toward the front of the vehicle and its end 29 toward the rear of the vehicle so that upon deceleration of the vehicle 10 the mercury 24 is at the front end of the tube 28 and in electrical circuit with a member in the form of a conductor or electrode 30 extending through the wall of the tube end 28. The electrode 30 is connected in circuit through suitable wiring 32 with electric light lamps forming part of the amber signal 16. A second member in the form of a conductor or electrode 34 extends through the wall of the tube end 29 and is connected in circuit through suitable wiring 36 with electrical lamps forming part of the green signals 18. When the typical ignition switch 38 of the vehicle is closed, an electrical circuit is closed between the vehicle battery 40 through suitable wiring 42 to a member in the form of a supply conductor or electrode 44 extending through the wall of the tube 26 at its rear end 29, this electrode extending substantially the entire length of the interior of the tube 26 and positioned to be always in circuit with the body of mercury 24.

Thus, when the vehicle is accelerated, the mercury 24 moves away from the tube end 28 and out of circuit with the electrode 30, and moves along a path through the tube 26 to its end 29 and into circuit with the electrode 34 thus completing a circuit from the battery 40 to the green signals 18. When the vehicle is decelerated, the mercury 24 moves back to the tube end 28 and into electrical circuit with the electrode 30 thus illuminating the amber signals 16. As will be more fully described later, the tube 26 provides a path for the mercury 24, this path ascending from the tube end 29 to the tube end 28.

Figure 3:
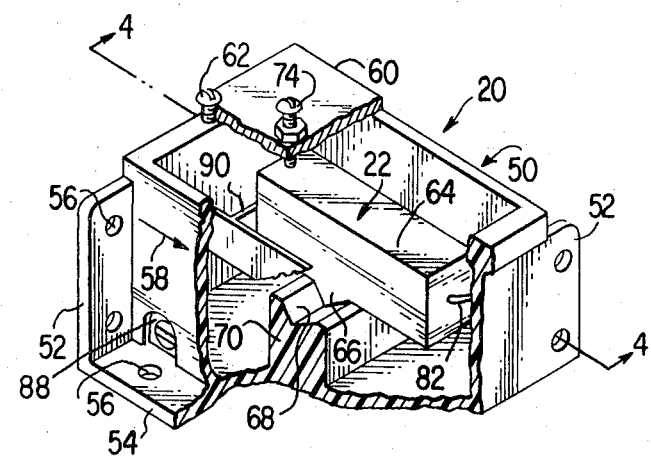
FIG. 3 is a fragmentary, schematic, prespective view of a sensor unit forming part of the circuit shown in FIG. 1, with parts broken away and removed for clearer illustration.
Figure 5:
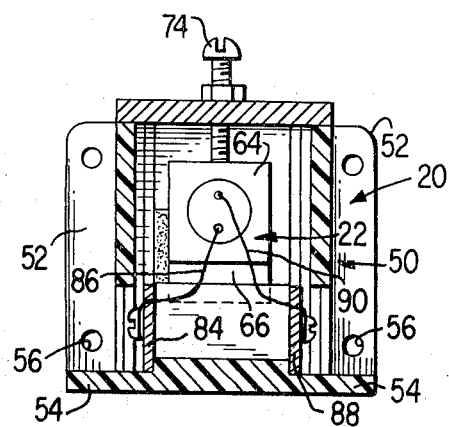
FIG. 5 is a schematic sectional taken generally along the line 5—5 in FIG. 4.
Figure 4:
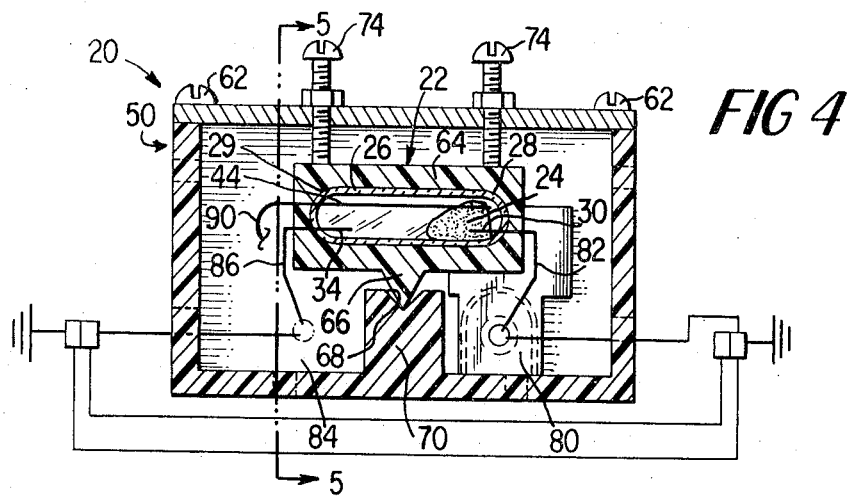
FIG. 4 is a schematic elevational sectional view taken generally along the line 4—4 in FIG. 3.

With particular reference FIGS. 3–5, the sensor unit 20 includes a housing or body 50, which is preferably a suitable plastic. The body 50 has integral flanges such as side flanges 52 and bottom flanges 54 with apertures 56 for fixedly securing the sensor unit 20 to a portion of the vehicle body or frame and positioned so that the tube end 28 points toward the front end of the vehicle 10 and the tube end 29 points toward the rear end of the vehicle, in the direction of the arrow 56 on the body 50. A metal cover 60 is positioned across a hollow in the body 60, and is secured in place by bolts 62 extending through holes in either end of the cover 60 and secured to the body in any suitable manner.

The sensor switch 26 is preferrably a mercury switch such as part number "HG 211 LO," manufactured by Gordos Corporation, 250 Glenwood Avenue, Bloomfield, N.J. The switch is preferrably fixedly encapsulated, as by the manufacturer, within a rigid plastic block 64 received within the hollow interior of the body 50 and having a fulcrum protrusion 66 seated in a generally V-shaped notch 68 in the top of an upright pedestal 70 formed integrally with the body 50 so that the inclination of the path of mercury 24 within the tube may be varied.

Adjustment of the mercury switch block 64 on its fulcrum 66 is provided by a pair of adjusting screws 74 threadedly received in holes proximate opposite ends of the cover 60 in position to engage opposite ends of the upper face of the block 64 (FIG. 4) so that the lower ends of the bolts 74 are firmly seated on the block 64 and may be adjusted up and down to secure the desired inclination of the mercury path within the tube and then fixed in adjusted position by suitable lock nuts on the bolts 74.

An electrical terminal 80 (FIG. 4) is suitably mounted in typical manner in operational fixed position withing the body. Although not shown in FIG. 2, this terminal forms part of the wiring 32 and more particularly, is connected by a wire 82 (FIGS. 3 and 4) with the electrode 30 and has a clamping screw for connection with the wiring leading to the amber signals 16 (FIG. 2). A second terminal 84 (FIGS. 4 and 5), though not shown in FIG. 2, is part of the wiring 36 and more particularly, is connected by a wire 86 with the electrode 34 and has a clamping screw for connection with the wiring leading to the green acceleration signals 18 (FIG. 2). A third terminal 88 (FIGS. 3 and 5), while not shown in FIG. 2, is part of the wiring 42 and, more particularly, is connected by a wire 90 (FIGS. 3 and 5) with the electrode 44 (FIG. 2), and has a clamping screw for connection into the wiring from the ignition switch 38.

As previously discussed, the sensor unit 20 described with reference to FIGS. 3–5, is adjusted by the adjusting bolts 74 so that during normal velocity operation or deceleration of the vehicle 10, the mercury 24 is at the front end 28 of the tube 26 in circuit with electrode 30, and remains in this position until the vehicle 10 is accelerated, whereupon the mercury 24 moves out of circuit with the electrode 30 and up the inclined path of the tube 26 to the tube end 29 and into circuit with the electrode 34.

Another embodiment of a sensor unit is shown in FIG. 6. This embodiment provides for the acceleration signal 18 as previously described, but also provides for operation of the amber signal 16 only when the vehicle is decelerating. This function may be provided by replacing the mercury switch 20 in the embodiment of FIGS. 3–5, with a switch 100, such as a Gordos mercury switch Part No. "HG 322 LO" in which the path of a body of mercury 102, within a sealed tube 104, descends from opposite ends 106 and 108 of the tube 104 to an intermediate portion of the tube, so that the mercury 102 is normally in a position intermediate the ends of the tube. These ends 106 and 108 contain electrodes 110 and 112 which serve the same general function as electrodes 30 and 34, respectively, in the embodiment of FIGS. 2–5. However, since the commercial mercury switch 100 has independent supply electrodes 114 and 116 extending through either end of the tube 100, these electrodes are connected to each other by a wire 118. The electrodes 110, 112, 114 and 116 are connected in circuit as described with reference to the corresponding electrodes 30, 32 and 44 in FIG. 2. The mercury switch 110 is preferably encapsuled in a block 122 as described with reference to the embodiment of FIGS. 3–5, and is illustrated with a typical fulcrum 124 received in an seat 126 in an upright pedestal 128. Thus, the mercury 102 stays in the intermediate position until the vehicle 10 is decelerated whereupon it moves to the end 106 of the tube 100 in circuit between the electrode 110 and 114, to operate the deceleration signals 16. Upon acceleration of the vehicle 10 the mercury 102 moves to the end 108 of the tube 100 and makes contact between the electrodes 112 and 116 to operate the acceleration signals 118.

FIGS. 7 and 8 illustrate another embodiment of a sensor unit. This embodiment provides the same function as the embodiment as shown in FIG. 6. That is, the signal 16 is operated only upon deceleration of the vehicle 10 and the signal 18 continues to be operated only upon acceleration of the vehicle.

As shown in FIGS. 7 and 8, a sensor unit 100' includes a body 102', preferably a plastic as previously discussed, having side attaching flanges 104' and bottom attaching flanges 106', these flanges having suitable apertures, as 108' for receiving fasteners to fixedly secure the switch unit 100' to the vehicle body or frame, as previously mentioned. A pair of switches 110' are each encapsuled in respective blocks 112' as previously described, each block having a fulcrum protusion 114' received in notches 116' formed in the body 102'. Pairs of adjusting bolts 120' are threadably received in apertures in a cover 122' secured across an open hollow in the body 102' as by bolts 124'', in a manner similar to that mentioned with reference to the bolts 62 in FIGS. 3–5. Each pair of bolts 120' is firmly seated against associated ones of the blocks 112' for varying the inclination of the block as described with reference to FIGS. 3–5. However, in this embodiment the switches 110' are preferably Gordos switches Part. No. "HG 219 LO" each having a supply electrode 124' and a second electrode 126'. One end of each tube is devoid of electrodes and is positioned so that a path for the mercury ascends therefrom toward the electrodes. However, the electrodes 124' and 126' for the deceleration signal 14 are positioned toward the front of the vehicle 10, and the electrodes 124' and 126' for the acceleration signal 18 are positioned toward the rear of the vehicle 10.

While this invention has been described with reference to particular embodiments in a particular environment, various changes may be apparent to one skilled in the art, and the invention is therefore not to be limited to such embodiments or environments except as set forth in the appended claims.

What is claimed is:

1. In a signal system for a vehicle, a sensor unit for actuating a signal responsive to movement of the vehicle, the sensor unit comprising, a body adapted to be operatively fixed to the vehicle, said body having a fulcrum part, a sensor including a container and a pair of spaced apart contacts for connection in circuit between a source of electrical power and the signal, and a mass of fluid movable in the container between a normal position out of circuit with at least one of the contacts and, responsive to a change of velocity of the vehicle a position in circuit with the contacts, for actuating the signal, a rigid block encasing said container and having a fulcrum part cooperating with the body fulcrum part, conductors, one connected with each of the contacts, and extending outwardly from the block, for connection in said circuit with the signal, and adjusting means mounted on the body and engaging the block for adjusting the disposition of the block and leveling the sensor after installation on the vehicle.

2. A sensor unit as set forth in claim 1 in which the block fulcrum part is generally centrally located between opposite ends of the block, and the adjusting means includes spaced apart adjusting parts, one at each of said opposite ends, and the adjusting parts firmly engage the block to hold the block in operatively fixed adjusted position.

3. A unit as set forth in claim 2 including a second signal, the signals indicating decelerating and acceleration of the vehicle, and in which said container has opposite ends, said contacts are positioned, one proximate each of said opposite ends, each contact adapted to be connected with a different one of the signals, said container provides a path for said mass and said path descends from proximate each of said opposite ends to a location intermediate said opposite ends, said normal position being proximate the intermediate location and the in-circuit position includes a pair of positions, one proximate each of said ends with the mass in-circuit with the proximate one of the contacts.

4. A unit as set forth in claim 3 in which the sensor is a mercury switch, the mass of fluid is mercury and the container is a glass tube embedded in the block.

* * * * *